US012319085B2

(12) United States Patent
Wilson et al.

(10) Patent No.: US 12,319,085 B2
(45) **Date of Patent: *Jun. 3, 2025**

(54) CHALK BOX WITH END HOOK SEATING ASSEMBLY

(71) Applicant: Apex Brands, Inc., Apex, NC (US)

(72) Inventors: Cecil Wilson, Sanford, NC (US); Eric Van Fossen, Huntersville, NC (US)

(73) Assignee: Apex Brands, Inc., Apex, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/397,117

(22) Filed: Dec. 27, 2023

(65) Prior Publication Data

US 2024/0123759 A1 Apr. 18, 2024

Related U.S. Application Data

(63) Continuation of application No. 17/440,056, filed as application No. PCT/US2020/023609 on Mar. 19, 2020, now Pat. No. 11,897,280.

(60) Provisional application No. 62/820,522, filed on Mar. 19, 2019.

(51) Int. Cl.
*B44D 3/38* (2006.01)

(52) U.S. Cl.
CPC .................................... *B44D 3/38* (2013.01)

(58) Field of Classification Search
CPC .................................... B44D 3/38
See application file for complete search history.

(56) References Cited

U.S. PATENT DOCUMENTS

| | | | | |
|---|---|---|---|---|
| 6,915,587 B1 * | 7/2005 | Scillia | B44D 3/38 33/414 |
| 7,231,722 B2 * | 6/2007 | Hickey | B44D 3/38 33/1 LE |
| 9,701,154 B2 * | 7/2017 | Parker | B44D 3/38 |
| 10,071,594 B2 * | 9/2018 | Chernyshou | B44D 3/38 |
| 10,071,597 B2 | 9/2018 | Tomita et al. | |
| 11,440,343 B2 * | 9/2022 | Beckwith | B44D 3/38 |
| 11,807,034 B2 * | 11/2023 | Wilson | B44D 3/38 |
| 11,897,280 B2 * | 2/2024 | Wilson | B44D 3/38 |
| 2008/0236442 A1 * | 10/2008 | Spaulding | B44D 3/38 106/31.01 |

(Continued)

FOREIGN PATENT DOCUMENTS

| | | |
|---|---|---|
| EP | 2420390 A1 | 2/2012 |
| WO | 2007113811 A1 | 10/2007 |

OTHER PUBLICATIONS

International Search Report and Written Opinion from related international application No. PCT/US2020/023609 mailed on Jul. 6, 2020, all pages enclosed cited in its entirety.

*Primary Examiner* — Yaritza Guadalupe-McCall
(74) *Attorney, Agent, or Firm* — Burr & Forman LLP

(57) ABSTRACT

A chalk box may include a housing having an aperture, a reel assembly enclosed within the housing, a string having a first end operably coupled to an end hook and configured to extend from the housing through the aperture and having a second end configured to be wound on the reel assembly, a chalk reservoir in which the string is retained or through which the string passes prior to extending out of the aperture, and a seating assembly configured to extend around at least fifty percent of the length or volume of the end hook when the string is fully withdrawn into the housing.

20 Claims, 6 Drawing Sheets

(56) References Cited

U.S. PATENT DOCUMENTS

| | | | | |
|---|---|---|---|---|
| 2016/0167425 | A1* | 6/2016 | Chernyshou | B44D 3/38 106/31.01 |
| 2016/0347117 | A1* | 12/2016 | Parker | B44D 3/38 |
| 2022/0185006 | A1* | 6/2022 | Wilson | B44D 3/38 |
| 2022/0203757 | A1* | 6/2022 | Beckwith | B44D 3/38 |
| 2022/0268367 | A1* | 8/2022 | Wilson | B44D 3/38 |
| 2022/0314687 | A1* | 10/2022 | Wilson | B44D 3/38 |
| 2022/0316520 | A1* | 10/2022 | Wilson | B44D 3/38 |
| 2022/0373315 | A1* | 11/2022 | Shaw | G01B 5/0004 |
| 2024/0123759 | A1* | 4/2024 | Wilson | B44D 3/38 |

* cited by examiner

FIG. 6A.
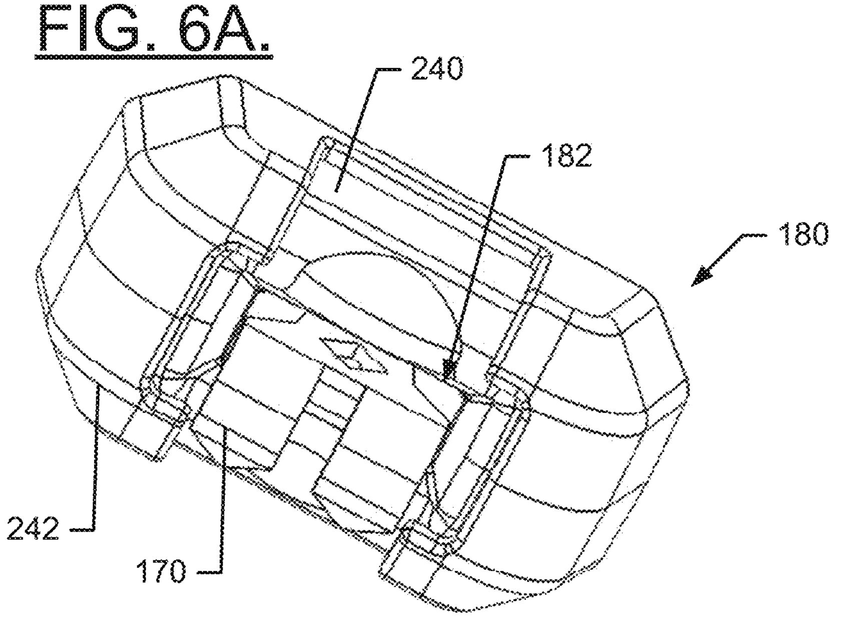
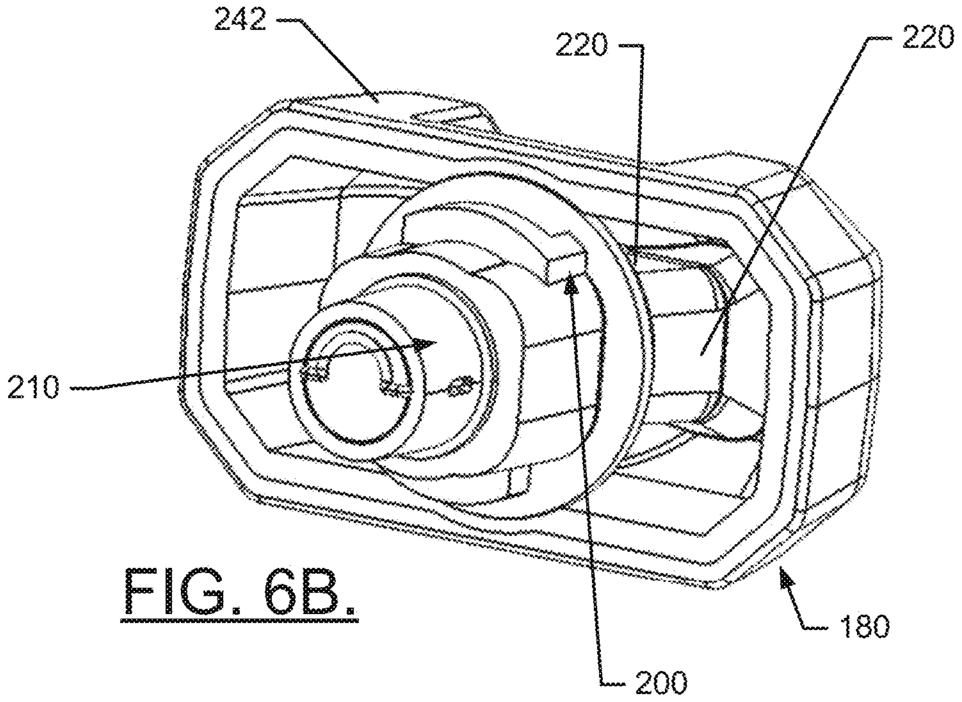
FIG. 6B.

CHALK BOX WITH END HOOK SEATING ASSEMBLY

CROSS-REFERENCE TO RELATED APPLICATIONS

This application is the continuation of U.S. application Ser. No. 17/440,056 filed Sep. 16, 2021, which is the national phase entry of International application number PCT/US2020/023609 filed on Mar. 19, 2020 which claims the benefit of U.S. Provisional application No. 62/820,522, filed on Mar. 19, 2019, the entire contents of which are hereby incorporated by reference.

TECHNICAL FIELD

Example embodiments generally relate to a chalk box or chalk reel, and more particularly relate to a chalk box or chalk reel having an end hook seating assembly.

BACKGROUND

A chalk box (sometimes referred to as a chalk reel or chalk line tool) is a tool for marking straight lines on surfaces. To accomplish this, the chalk box typically includes a string or line that may be made of nylon, cotton or other materials and is able to be wound or spooled up onto a reel assembly. The string is exposed to chalk (or another marking substance) within the tool. The string typically has an end hook at one end, and the end hook extends from a body of the tool. The end hook can be pulled, thereby extracting string from the reel assembly, to place the end hook at a first point that is distant from a second point near which the remainder of the tool will be retained. Alternatively, the end hook could be affixed to the first point and the remainder of the tool can be moved to the second point while withdrawing string from the reel assembly. In either case, the end hook retains the string at the first point, and the user may pull the string relatively tightly to the second point (e.g., holding the string at the second point with the user's hand or thumb). The user may then pluck or snap the string sharply, and the chalk may be transferred to the surface to mark a straight line between the first and second points. The marked line is often referred to as a chalk line and, after its formation, the user often operates a rotatable handle that is operably coupled to the reel assembly to retract the string back onto the reel or drum thereof.

The process described above, and the tool adapted for performing the process, are both very old. However, equally old in relation to this tool, is the fact that the conventional design for the tool leaves the end hook exposed or dangling from the end of the tool. In this regard, since the chalk box has a chalk reservoir inside, it is necessary to keep the exit hole for the string very close in size to the diameter of the string. Since this exit hole typically exists at one end of the housing of the tool, there is simply no possibility to draw the end hook into the housing of the tool. The end hook can therefore inadvertently attach to things and withdraw string from the chalk box.

BRIEF SUMMARY OF SOME EXAMPLES

Some example embodiments may enable the provision of a chalk box that has an improved design, which enables the end hook to be nested in the tool housing and fully (or flush) seated with the mouth or nozzle of the chalk box.

In an example embodiment, a chalk box (also known as a chalk reel or chalk line tool) is provided. The chalk box may include a housing having an aperture, a reel assembly enclosed within the housing, a string having a first end operably coupled to an end hook and configured to extend from the housing through the aperture and having a second end configured to be wound on the reel assembly, a chalk reservoir in which the string is retained or through which the string passes prior to extending out of the aperture, and a seating assembly configured to extend around at least fifty percent of the length or volume of the end hook when the string is fully withdrawn into the housing.

In another example embodiment, a seating assembly for a chalk box is provided. The seating assembly may include a body portion operably coupled to a housing of the chalk box, and a reception cavity formed in the body portion and extending radially outwardly with respect to an axis about which a reel assembly of the chalk box rotates. The reception cavity may be bounded by four sidewalls, and at least fifty percent of a length or volume of the end hook may be disposed within the reception cavity when the string is fully withdrawn into the housing.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIG. 6A is a top perspective isolation view of the seat assembly in accordance with an example embodiment;

FIG. 6B is a bottom perspective isolation view of the seat assembly in accordance with an example embodiment;

DETAILED DESCRIPTION

Figure 2:
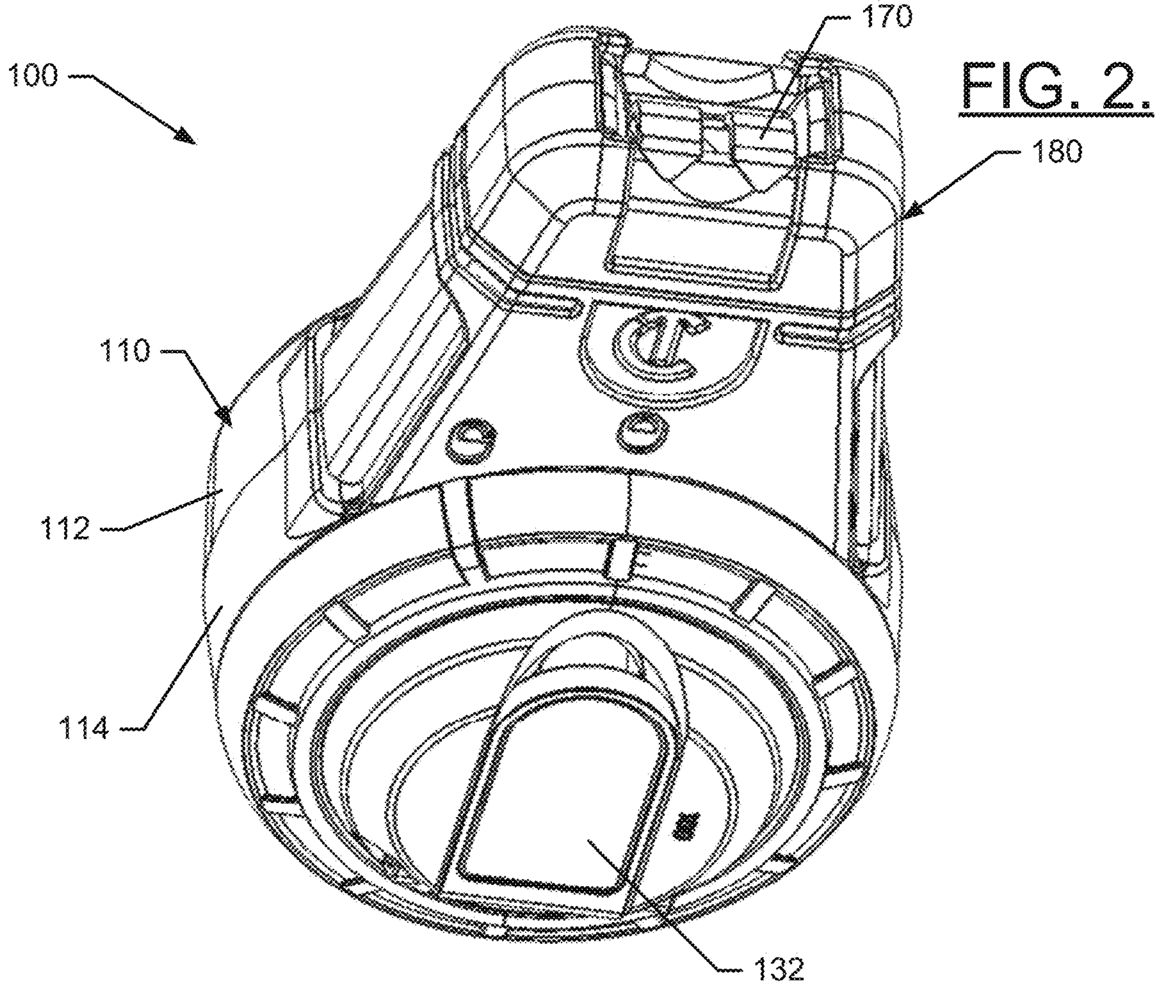
FIG. 2 illustrates a front perspective view of the chalk box in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Figure 1:
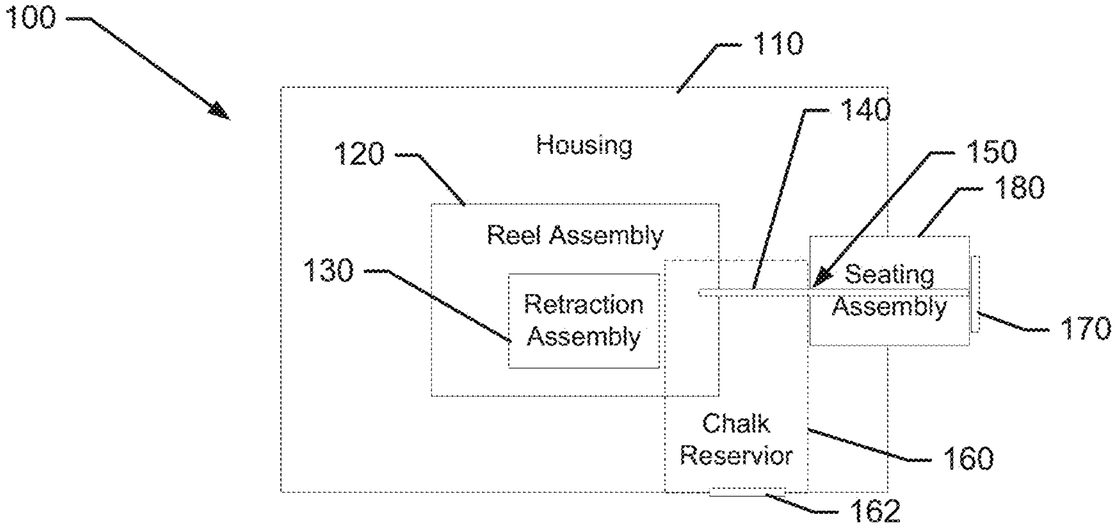
FIG. 1 illustrates a block diagram of a chalk box in accordance with an example embodiment.
Figure 3:
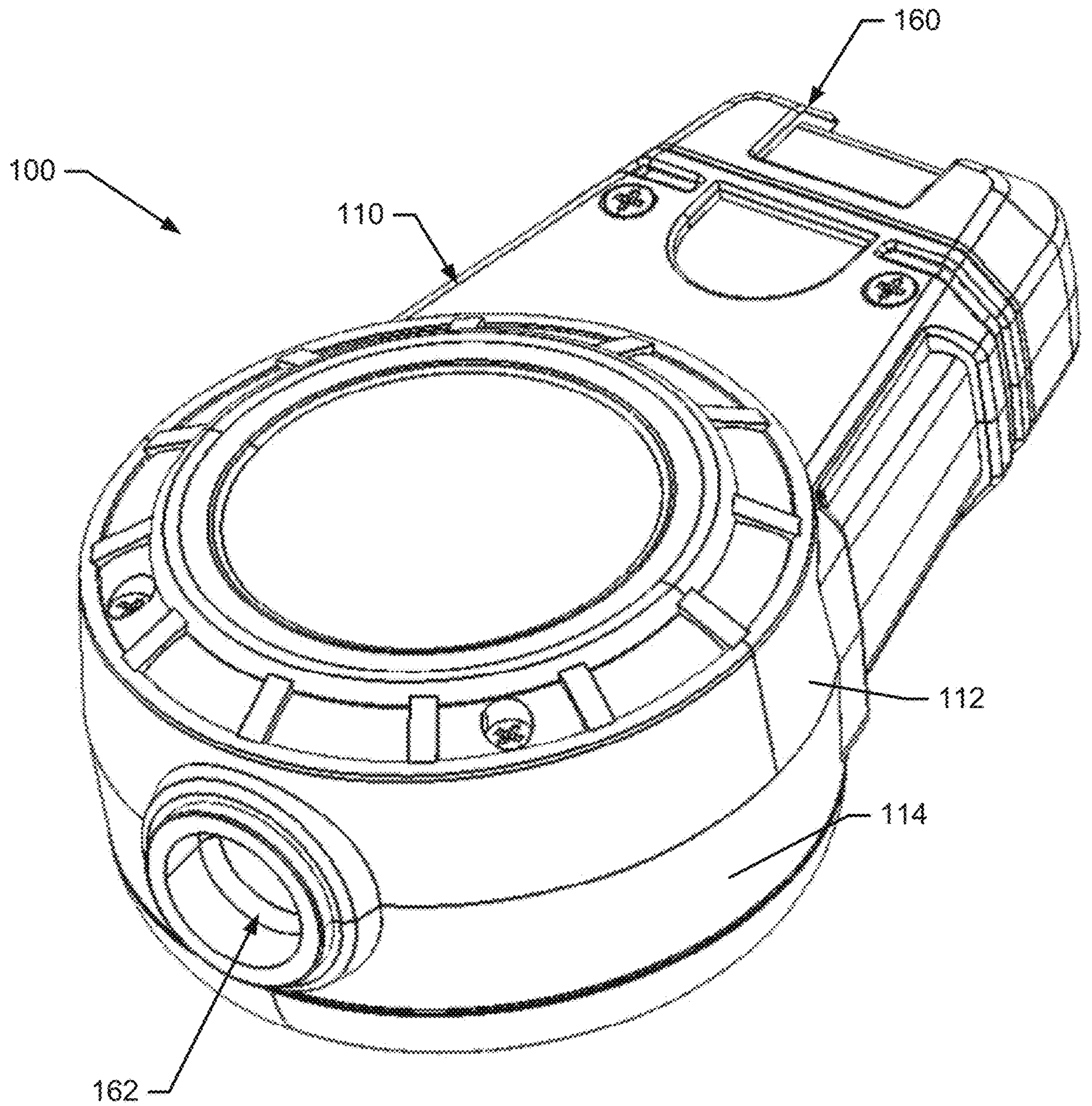
FIG. 3 illustrates a rear perspective view of the chalk box in accordance with an example embodiment.
Figure 4:
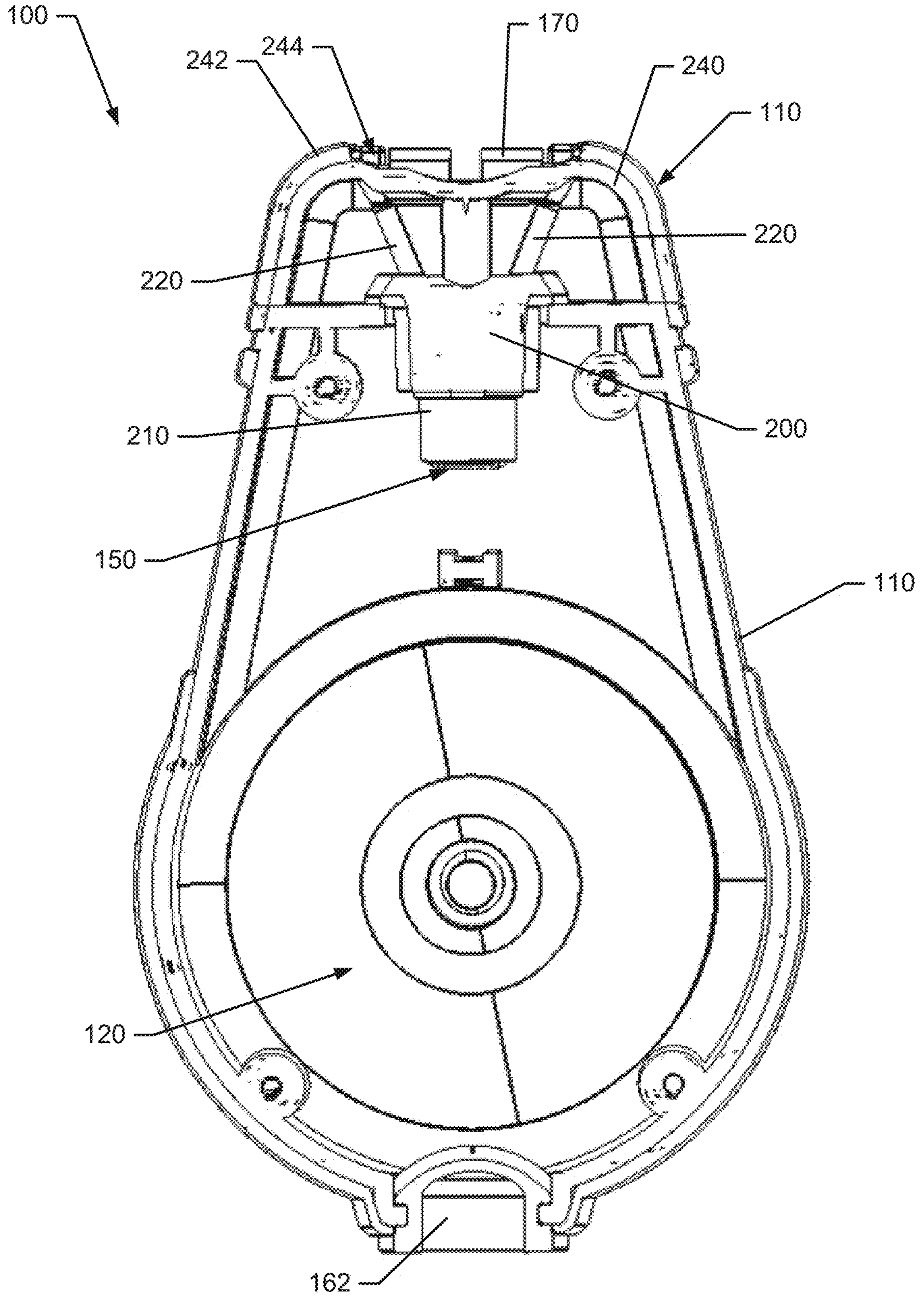
FIG. 4 illustrates a cross section view taken along a plane passing through the intersection between case halves of the chalk box in accordance with an example embodiment.
Figure 5:
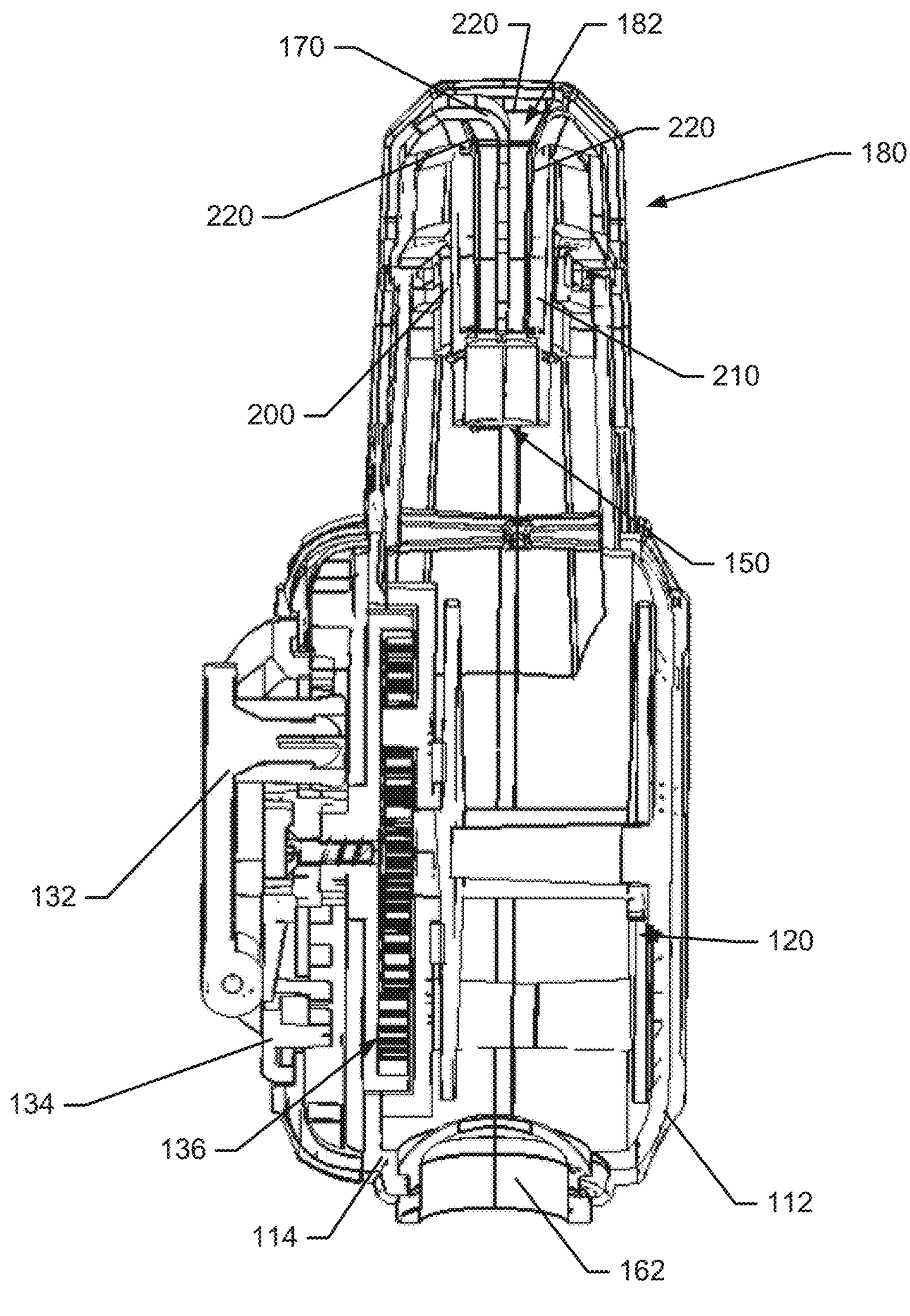
FIG. 5 is a cross section view taken along a longitudinal centerline of the chalk box via a plane that is perpendicular to the plane mentioned above in reference to FIG. 4 in accordance with an example embodiment.
Figure 6D:
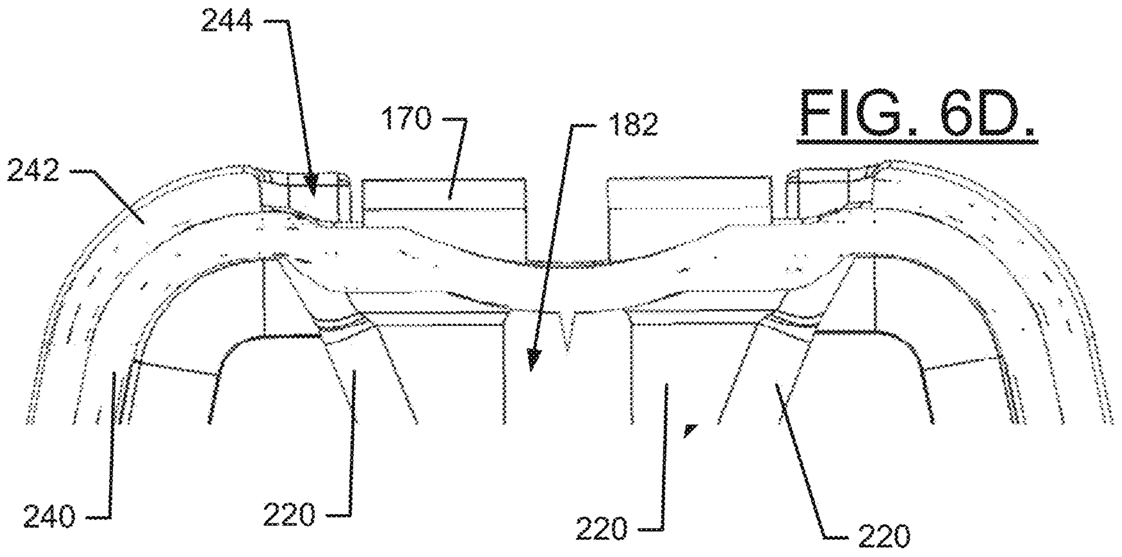
FIG. 6D is a top perspective isolation view of the seat assembly having the end hook removed therefrom to improve the visibility of the reception cavity in accordance with an example embodiment.
Figure 6C:
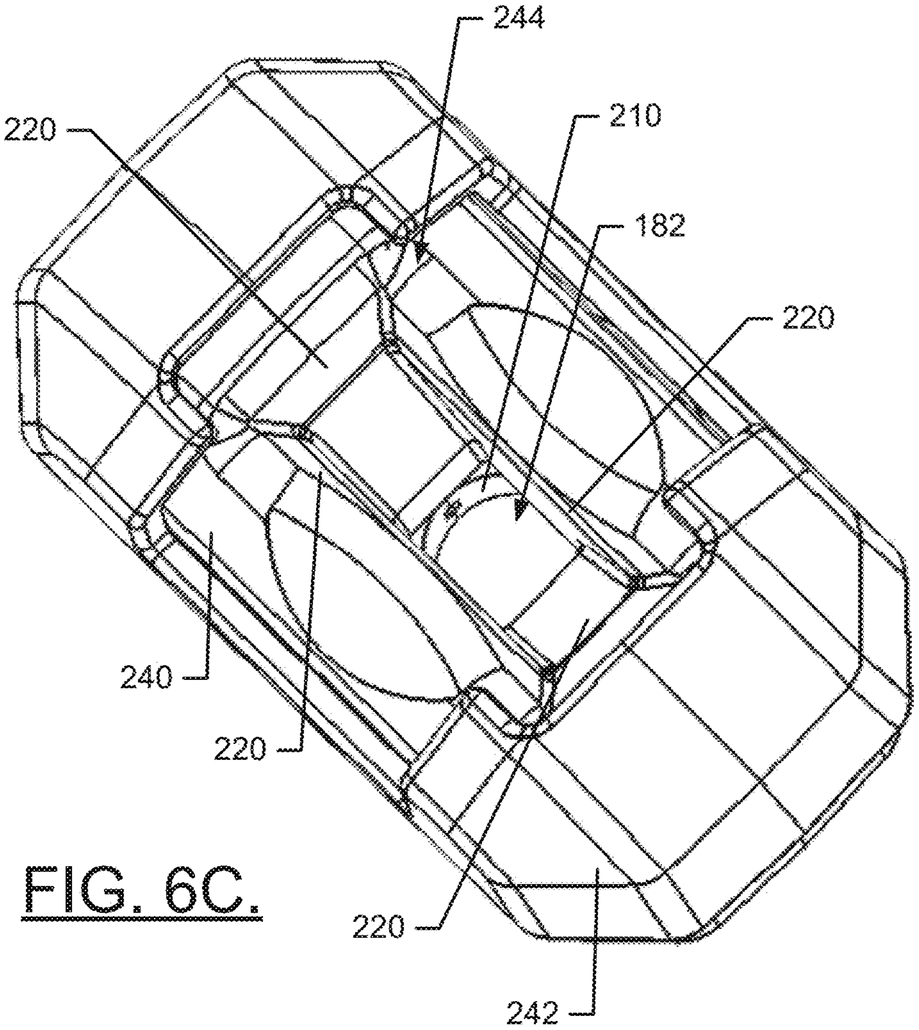
FIG. 6C is a cross section view of a recessed area formed in the seat assembly in accordance with an example embodiment.

As indicated above, some example embodiments may relate to the provision of a chalk box that may have an improved design for retention of a majority portion of the end hook. This may be accomplished by providing a seating assembly as described herein. FIG. 1 illustrates a block diagram of a chalk box 100 in accordance with an example embodiment, and FIGS. 2 and 3 illustrate front and rear perspective views, respectively, of the chalk box. FIG. 4 illustrates a cross section view taken along a plane passing through the intersection between case halves of the chalk box. FIG. 5 is a cross section view taken along a longitudinal centerline of the chalk box via a plane that is perpendicular to the plane mentioned above in reference to FIG. 4. FIG. 6, which is defined by FIGS. 6A, 6B, 6C and 6D, illustrates various views of a nozzle portion of the chalk box, where the nozzle portion is one example of a seating assembly configured to retain a majority portion of the end hook of the chalk box.

Referring now to FIGS. 1-6, a chalk box 100 of an example embodiment may include a housing 110 comprising a first case half 112 and a second case half 114. The first and second case halves 112 and 114 may house a reel assembly 120 and a retraction assembly 130 therein. A string 140 (or line) may be wound onto the reel assembly 120 and may be alternately withdrawn from and retracted back onto the reel assembly 120. The retraction back onto the reel assembly 120 may be accomplished via the retraction assembly 130, which may include a foldable handle 132 that is folded in to nest into a portion of the second case half 114, and folded out in order to enable the user to turn the handle 132. When the handle 132 is folded out and turned, a hub 134 rotates and is operably coupled to a gear assembly (see gear assembly 136 of FIG. 5) that may provide multiple rotations of a drum or reel of the reel assembly 120 for each respective rotation of the handle 132.

The string 140 may be paid out through an aperture 150 formed in a portion of the housing 110. The aperture 150 may be formed to be slightly larger than a diameter of the string 140, and may further house or retain a filter or wiping member, such as a piece of felt or other material that prevents excess escape of chalk from a chalk reservoir 160 that is exposed to the string 140 while the string 140 is inside the housing 110, and also removes excess chalk from the string 140 as the string 140 is withdrawn from the housing 110. The felt may be held in place by a retaining wire or other structure. The string 140 may therefore pass through or be retained in the chalk reservoir 160 before passing out the aperture 150. In an example embodiment, the chalk reservoir 160 may include a plug 162 that is accessible from outside the housing 110 to be removed to enable refilling of the chalk reservoir 160. The plug 162 of this example is located at a bottom portion of the housing 110, but other locations for the plug 162 are also possible.

The string 140 has an end hook 170 disposed at one end thereof, and is affixed to the reel assembly 120 at the other end of the string 140. The end hook 170 may be affixed (temporarily) to an anchor point on a medium or surface that is to be marked. Once the end hook 170 is affixed to the anchor point, the string 140 may be paid out of the aperture 150 and unwound from the reel assembly 120. When a desired length of the string 140 has been paid out, the user can make any necessary markings by snapping or plucking the string 140 as described above. The end hook 170 may then be released from the anchor point, and the handle 132 may be used to operate the retraction assembly 130 to wind the string 140 back onto the reel assembly 120 by drawing the string 140 back into the housing 110 via the aperture 150.

As noted above, the end hook 170 is typically dangling, or at least substantially (i.e., more than 50% of its length or volume) extended out of the housing 110. Example embodiments prevent this arrangement by providing a seating assembly 180. The seating assembly 180 may be formed as a mouth or nozzle that includes a reception cavity 182 that is formed therein to allow the end hook 170 to be withdrawn into the reception cavity 182. When the end hook 170 is withdrawn into the reception cavity 182, the end hook 170 may be seated flush with the distal end (relative to the remainder of the housing 110) of the seating assembly 180. In other words, the end hook 170 is fully seated in a portion of the housing 110 (specifically in the reception cavity 182 of the seating assembly 180) such that substantially all of the body, back, base or spine of the end hook 170 is received or surrounded by the reception cavity 182 and only the teeth or prongs (which extend at about a 90 degree angle to the body, back, base or spine) are outside the reception cavity 182. This arrangement ensures that the end hook 170 cannot be inadvertently snagged or caught on objects, clothing and/or the like, but also creates a sleek and aesthetically pleasing appearance.

Although the example described above fully seats the end hook 170, it should be appreciated that example embodiments need not necessarily fully receive or seat the end hook 170 in the housing 110. To the contrary, some example embodiments may receive greater than 50% (by length and/or volume) of the end hook 170 within the reception cavity 182. In such an example, the likelihood of the end hook 170 catching inadvertently on objects may be substantially reduced, and the end hook 170 may still be prevented from dangling at the end of the seating assembly 180.

A structure of the seating assembly 180 and the reception cavity 182 may be more fully appreciated by referring to FIGS. 4-6. In this regard, the seating assembly 180 may be attached to the first and second case halves 112 and 114 by a quarter turn interlocking member 200. The interlocking member 200 may snap fit or otherwise be operably coupled to a stem portion 210 of the seating assembly 180, and the stem portion 210 may extend into the first and second case halves 112 and 114 at an interface thereof. The stem portion 210 and interlocking member 200 may be inserted into a top portion of the housing 110 offset by 90 degrees from the alignment shown in FIGS. 2-5 and then rotated to the alignment shown in FIGS. 2-5 to press fit the seating assembly 180 to the housing 110.

The reception cavity 182 may be formed by four sidewalls 220 that may be disposed in contact with each other at their respective lateral edges, and that may taper toward or otherwise operably couple with the stem portion 210. The body, back, base or spine of the end hook 170 may extend at least partially into the stem portion 210, but may also be surrounded on four sides by the sidewalls 220. In an example embodiment, two of the sidewalls 220 may mirror each other on opposing lateral sides of the end hook 170, and the other two sidewalls 220 may mirror each other on opposing front and back faces of the body, back, base or spine of the end hook 170. The two sidewalls proximate to the opposing lateral sides of the end hook 170 may taper toward each other as they approach the stem portion 210 in some cases. Meanwhile, the two sidewalls that face the front and back of the end hook 170 may also taper, but may have a less steep taper. In some cases, the tapering may only occur at the distal end of the reception cavity 182.

In an example embodiment, portions of the seating assembly 180 may be formed by molding plastic materials to form a body portion within which the sidewalls 220 are formed. For example, the seating assembly 180 may include a substrate portion 240, which contacts the prongs or teeth of the end hook 170 when the end hook 170 is fully seated in the reception cavity 182. The seating assembly 180 may also include an overmold portion 242 that forms a slightly recessed area 244 inside which the teeth or prongs of the end hook 170 may be retained so that, when fully seated, the end hook 170 is entirely below a plane extended across the top of the overmold portion 242. In this regard, the overmold portion 242 may include two parts separated from each other by the recessed area 244.

As such, the body portion of the seating assembly 180 may include the overmold portion 242 and the substrate portion 240 with the sidewalls 220 forming the reception cavity 182 therein. The stem portion 210 may extend downwardly away from the recessed area 244, and the shape of the reception cavity 182 may generally be arranged so that the reception cavity 182 generally fits the form of the base of the end hook 170. The tapering of the sidewalls 220 may cause the end hook 170 to be oriented properly to become fully seated within the reception cavity 182 when the string 140 is fully withdrawn (i.e., withdrawn as far as the string 140 can be on the reel assembly 120) into the housing 110. In some cases, the overmold portion 242 and the substrate portion 240 could instead be made as snap fitted or joined (e.g., by adhesive) separate pieces.

In an example embodiment, a chalk box is provided. The chalk box may include a housing having an aperture, a reel assembly enclosed within the housing, a string having a first end operably coupled to an end hook and configured to extend from the housing through the aperture and having a second end configured to be wound on the reel assembly, a chalk reservoir in which the string is retained or through which the string passes prior to extending out of the aperture, and a seating assembly configured to extend around at least fifty percent of the length or volume of the end hook when the string is fully withdrawn into the housing.

In some embodiments, the features of the device described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, the seating assembly may be operably coupled to the housing such that the string extends radially outwardly from the reel assembly through the aperture and into the seating assembly. In an example embodiment, the seating assembly may include a reception cavity bounded by four sidewalls, and a base of the end hook may be substantially entirely surrounded by the four sidewalls when the string is fully withdrawn into the housing. In some cases, each of the four sidewalls tapers inwardly toward the aperture over at least a portion of the sidewalls. In an example embodiment, the housing may include a first case half and a second case half, and the seating assembly may be joined to the first and second case halves via a press fitting. In some cases, the seat assembly may include a substrate and an overmold portion, and the overmold portion includes two opposing sides separated by a recessed area at which the substrate is exposed. In an example embodiment, the end hook may be retained in the recessed area in contact with the substrate when the string is fully withdrawn into the housing. In some cases, the end hook may be disposed entirely below a plane extending over a top of the opposing sides of the overmold portion when the string is fully withdrawn into the housing. In an example embodiment, the end hook may include a base having a front side and a back side. Prongs of the end hook may extend substantially perpendicularly away from the front side, and the front and back sides of the end hook may each lie in a plane that extends substantially perpendicular to an axis of the reel assembly when the string is fully withdrawn into the housing. In some cases, the front and back sides of the end hook may be tapered as the end hook extends toward the string. In an example embodiment, the seating assembly may include a reception cavity, and the reception cavity may be tapered to substantially match a shape of the front and back sides of the end hook.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A chalk box comprising:

a housing having an aperture;

a reel assembly enclosed within the housing;

a string having a first end operably coupled to an end hook and a second end wound on the reel assembly to extend from the housing through the aperture;

a chalk reservoir formed in a portion of the housing and in which the string is retained or through which the string passes prior to extending out of the aperture; and a seating assembly extending around at least fifty percent of a length or volume of the end hook when the string is fully withdrawn into the housing.

2. The chalk box of claim 1, wherein the seating assembly is operably coupled to the housing such that the string extends radially outwardly from the reel assembly through the aperture and into the seating assembly.

3. The chalk box of claim 2, wherein the seating assembly comprises a reception cavity bounded by four sidewalls, and wherein a base of the end hook is substantially entirely surrounded by the four sidewalls when the string is fully withdrawn into the housing.

4. The chalk box of claim 2, wherein each of the four sidewalls tapers inwardly toward the aperture over at least a portion of the sidewalls.

5. The chalk box of claim 1, wherein the housing comprises a first case half and a second case half, and wherein the seating assembly is joined to the first and second case halves via a press fitting.

6. The chalk box of claim 1, wherein the seating assembly comprises two opposing sides separated by a recessed area, and wherein the end hook is retained in the recessed area when the string is fully withdrawn into the housing.

7. The chalk box of claim 6, wherein the end hook is disposed entirely below a plane extending over a top of the opposing sides of the overmold portion when the string is fully withdrawn into the housing.

8. The chalk box of claim 1, wherein the end hook comprises a base having a front side and a back side, wherein prongs of the end hook extend substantially perpendicularly away from the front side, and wherein the front and back sides of the end hook each lie in a plane that extends substantially perpendicular to an axis of the reel assembly when the string is fully withdrawn into the housing.

9. The chalk box of claim 8, wherein the front and back sides of the end hook are tapered as the end hook extends toward the string.

10. The chalk box of claim 9, wherein the seating assembly comprises a reception cavity, and wherein the reception cavity is tapered to substantially match a shape of the front and back sides of the end hook.

11. A chalk box comprising:

a housing having an aperture;

a reel assembly enclosed within the housing;

a string having a first end operably coupled to an end hook and a second end wound on the reel assembly to extend from the housing through the aperture;

a chalk reservoir formed in a first portion of the housing and in which the string is retained or through which the string passes prior to extending out of the aperture; and a seating assembly disposed at a second portion of the housing extending around at least a portion of a length or volume of the end hook when the string is fully withdrawn into the housing, wherein the seating assembly comprises a first case half and a second case half, and wherein the seating assembly is conformal with the first portion of the housing.

12. The chalk box of claim 11, wherein the seating assembly is operably coupled to the housing such that the string extends radially outwardly from the reel assembly through the aperture and into the seating assembly.

13. The chalk box of claim 12, wherein the seating assembly comprises a reception cavity bounded by four sidewalls, and wherein a base of the end hook is substantially entirely surrounded by the four sidewalls when the string is fully withdrawn into the housing.

14. The chalk box of claim 12, wherein each of the four sidewalls tapers inwardly toward the aperture over at least a portion of the sidewalls.

15. The chalk box of claim 11, wherein the housing comprises a first case half and a second case half, and wherein the first and second case halves of the seating assembly conform to the first and second case halves of the housing.

16. The chalk box of claim 11, wherein the seating assembly comprises two opposing sides formed of molded plastic and separated by a recessed area, and wherein the end hook is retained in the recessed area when the string is fully withdrawn into the housing.

17. The chalk box of claim 16, wherein the end hook is disposed entirely below a plane extending over a top of the opposing sides of the overmold portion when the string is fully withdrawn into the housing.

18. The chalk box of claim 11, wherein the end hook comprises a base having a front side and a back side, wherein prongs of the end hook extend substantially perpendicularly away from the front side, and wherein the front and back sides of the end hook each lie in a plane that extends substantially perpendicular to an axis of the reel assembly when the string is fully withdrawn into the housing.

19. The chalk box of claim 18, wherein the front and back sides of the end hook are tapered as the end hook extends toward the string.

20. The chalk box of claim 19, wherein the seating assembly comprises a reception cavity, and wherein the reception cavity is tapered to substantially match a shape of the front and back sides of the end hook.

* * * * *